United States Patent [19] — Fish et al.
[11] Patent Number: 4,464,787
[45] Date of Patent: Aug. 7, 1984

[54] APPARATUS AND METHOD FOR CURRENCY VALIDATION

[75] Inventors: Leonard A. Fish, Chicago; Thomas Hanger, Melrose Park, both of Ill.
[73] Assignee: Casino Technology, Schiller Park, Ill.

[21] Appl. No.: 276,684
[22] Filed: Jun. 23, 1981
[51] Int. Cl.³ .......... G06K 9/62
[52] U.S. Cl. .......... 382/7; 382/29; 382/34; 382/64
[58] Field of Search .......... 382/7, 33, 34, 41, 64, 382/29; 235/379, 449, 493; 209/534, 567, 569; 194/4 R, 4 E; 340/825.3, 825.34

[56] References Cited

U.S. PATENT DOCUMENTS

| | | | |
|---|---|---|---|
| 3,509,535 | 4/1970 | Berube | 382/7 |
| 4,086,567 | 4/1978 | Crane et al. | 382/34 |
| 4,179,685 | 12/1979 | O'Maley | 382/7 |
| 4,283,708 | 8/1981 | Lee | 382/7 |
| 4,311,914 | 1/1982 | Huber | 382/7 |
| 4,356,473 | 10/1982 | Freudenthal | 382/7 |

*Primary Examiner*—Leo H. Boudreau
*Attorney, Agent, or Firm*—Hill, Van Santen, Steadman & Simpson

[57] ABSTRACT

A method of identifying and designating one of a plurality of denominations of a bill or other paper currency, and apparatus therefor, scans a line along the length of the bill, and stores significant pulses in the scanning signal. The position of the significant pulses are modified, in accordance with identified characteristics of the bill which is scanned, and then compared with stored values for the expected locations of key ones of such pulses. Coincidences with the key pulses are counted, and secondary pulses, which are significant pulses occurring between key pulses are also counted. Both counts are relied on in identifying the correct denomination.

19 Claims, 16 Drawing Figures

APPARATUS AND METHOD FOR CURRENCY VALIDATION

BACKGROUND OF THE INVENTION

1. Field of the Invention

The present invention relates to currency validation apparatus, and more particularly to such apparatus which identifies the genuineness and denomination of currency by sensing the magnetic characteristics of a piece of currency along a predetermined scan line.

2. The Prior Art

The major obstacle to the utility of machines which automatically handle currency, such as bill changers and the like, has been the inability to recognize the genuineness in denomination of more than a limited number of denominations of currency. Machines are available which recognize a dollar bill as genuine, and supply change in the form of a plurality of coins. Some of such machines are able to sense the difference between a one dollar bill and a five dollar bill, and return the proper change accordingly, but it has not heretofore been possible to sense the genuineness and denomination of all denominations of bills, making automatic multiple denomination transactions, (say 3 or more) impossible when larger denomination bills are concerned. It is however, very desirable to provide an automatic mechanism for determining the genuineness and denomination of various small and large denomination bills, so that the intervention of a human teller or cashier is not necessary in transactions which involve bills of large denomination. Such devices may be employed for the automatic vending of relatively valuable articles such as airline and railroad tickets, or for changing from the currency of one country to another. Such apparatus is also useful for dispensing gambling tokens of relatively large denomination, or of smaller denominations in such quantity as to equal various small and large denomination bills.

SUMMARY OF THE INVENTION

It is a principal object of the present invention to provide apparatus and a method for determining the genuineness and denomination of at least seven individual denominations of currency, such as bills representing values of one, two, five, ten, twenty, fifty and one hundred dollars.

It is another object of the present invention to provide apparatus and a method for determining the genuineness and denomination of three or more bills by sensing the physical characteristics of such bill along a predetermined scan path, and comparing such characteristics to stored data corresponding to a typical unit of currency of the same denomination.

Another object of the present invention is to provide an apparatus and method for determining the genuineness and denomination of three or more units of currency by matching the physical characteristics detected on a sample unit of currency along a predetermined scan path with stored parameters, and tolerances reflecting differences among individual units of a given denomination.

In one embodiment of the present invention, there is provided a means for scanning a predetermined path across a unit of currency, and for detecting the physical characteristics of the unit along said path, storing representations of said physical characteristics, identifying peak values in the parameter being sensed, and comparing the positions of the sensed peak values with stored representations corresponding to the locations of such peak values in a typical bill of given denomination, and with a tolerance in the location of such peak values.

The present invention achieves the desirable object of identifying genuine bills, and designating their denomination, with extremely high accuracy, and without any uncertainty as to the genuineness or denomination.

These and other objects and advantages of the present invention will become manifest by an inspection of the following description and the accompanying drawings.

BRIEF DESCRIPTION OF THE DRAWINGS

Reference will now be made to the accompanying drawings, in which.

DESCRIPTION OF THE PREFERRED EMBODIMENT

Figure 1:
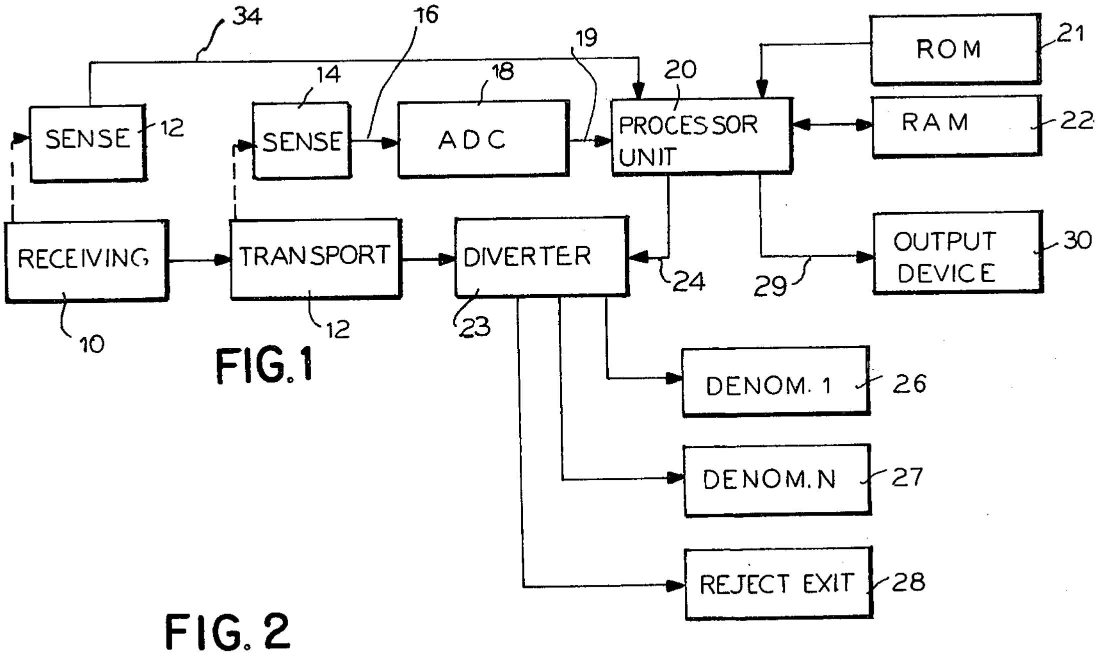
FIG. 1 is a functional block diagram of apparatus incorporating an illustrative embodiment of the present invention.

Referring first to FIG. 1, a functional block diagram of apparatus incorporating an illustrative embodiment of the present invention is illustrated. A receiving mechanism 10 is provided for receiving a bill, and may be in the form of a slot tray or the like. Once received, the bill is transported by a bill transport device 12 past a sensing unit 14. The sensing unit is adapted to sense and amplify a physical parameter of the bill along the scanning path, and produce electrical signals on an output line 16 corresponding to the parameter which is sensed. The line 16 is connected to the input of analog to digital converter 18, which supplies digital signals to a processor 20. The processor 20 cooperates with a memory unit 22, for processing signals derived from the analog to digital converter 18, to determine the genuineness and denomination of the bill sensed by the sensing unit 14. Downstream from the bill transport unit 12, a diverter unit 23 is provided, which receives signals from the processor 20 over a line 24 indicating the denomination of the bill or whether the bill is to be rejected. From the diverter unit 22 the bill passes into a plurality of bins 26 and 27 provided for individual denominations, or a reject exit 28 provided for bills for which no denomination can be determined, such as bills which are not genuine or bills which have been mutilated sufficiently to affect the signals developed by the sensing unit 14.

The processor 20 also supplies signals to an output device 30 which may be, for example, a change dispenser, or other dispensing mechanism.

The particular form of the receiving mechanism, transport mechanism, and diverter mechanism may be any of those which are conventionally used, and which are well known to those skilled in the art.

The sensing unit 14 may also sense a plurality of parameters such as optical or magnetic parameters of the bill. Preferably, the sensing unit 14 is a magnetic sensing head, which senses the magnetic characteristics along a longitudinal path parallel with the long dimension of the bill, approximately midway between the long edges of the bill.

In operation, when a bill is received by the receiving mechanism 10, its presence is sensed by a sensing unit 32, which develops a signal on line 34, indicating to the processor unit 20 that a bill is being received in the receiving mechanism and that scanning signals will shortly be developed from the scanning sensor 14. This readies the processor unit 20 for operation, so that it is ready to process the signals supplied to it from the analog to digital converter 18.

Reference will now be made to FIGS. 2–14 which illustrate the construction and operation of the units within the processor 20. Preferably the processor unit 20 is a microprocessor or the like, having a read only memory (ROM) 21 and able to cooperate with a random access memory (RAM) 22, which may be used to store data during operation, and is capable of being written into and read from during the validation procedure. When a microprocessor is used for the processor unit 20, the various units illustrated in FIGS. 2–13 typically comprise instruction sequences for the microprocessor, so that the necessary operations are performed in a prescribed sequence, under the control of instructions stored in the ROM of the processor unit 20.

Alternatively, the present invention may be constructed with a separate physical unit of apparatus for each of the units illustrated in FIGS. 2–13 represent specific hardware such as a register, comparator, means for storing or the like.

Figure 2:
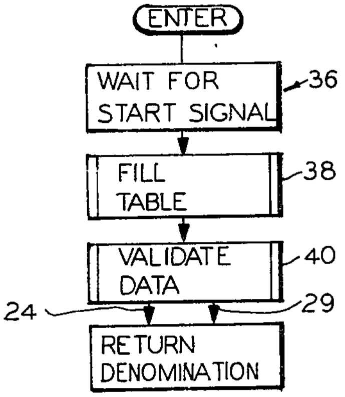
FIGS. 2–13 are flow charts of operations performed by the apparatus illustrated in FIG. 1.

FIG. 2 is a functional block diagram of the overall validation procedure. Before a bill is inserted into the receiving mechanism 10, a unit 36 continuously inspects the state of the sensing unit 32. When the sensing unit 32 indicates that a bill has been inserted into the receiving mechanism 10, and is passing by the sensing unit, that fact is indicated by a signal on line 34, which is recognized by the unit 36, after which control is passed to a group of units indicated in FIG. 2 as 38, the function of which is to fill a table of the RAM memory 22 with samples representing outputs of the analog to digital converter unit 18 corresponding to spaced locations along with scanning path as sensed by the sensing unit 14. Preferably, when the scanning is by means of a magnetic sense head, the signal recognized by the unit 36 corresponds to the first magnetic ink line, at the left hand margin of the bill. Alternatively, it may be a miniature switch or the like actuated by the leading or left hand edge of the bill. The data is then read into the RAM memory 22 via the processor 20, from the read head 14, beginning with the first magnetic ink which is sensed. The units of the group 38 are shown in detail in FIG. 3. When the operations performed by the units of group 38 are completed, control is passed to a group of units 40, which perform the function of validating the data, by operating on the samples loaded into the table within the RAM memory 22. The individual units within the group 40 are illustrated in FIGS. 4–10. When these units have completed their function, signals are provided on lines 24 and 29, for operating the diverter unit 22, and for signalling the output device 30 with the denomination of the bill which has been sensed by the sensing unit 14. The lines 19, 24 and 29, although indicated in FIG. 1 as single lines, are actually representative of plural lines. Thus a plurality of lines 24 are selectively energized in order to operate the diverter unit 23 for allowing the bill to be received in one of the several denomination bins 26 and 27, or delivered to the reject exit 28. Similarly, the pair of the plurality of lines 29 may carry the several bits of a digital word from the processor unit 20 to the output device 30, or a plurality of different lines 29 may be provided for indicating to the output device 30 bills which are received of the several different denominations.

Figure 3:
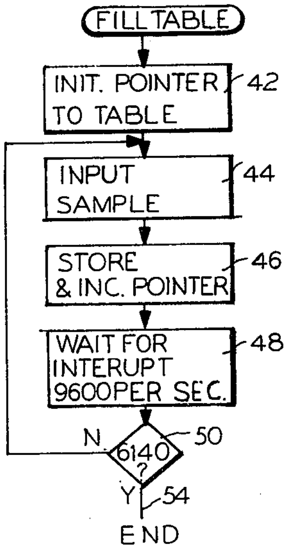

Referring to FIG. 3, which illustrates the group of units for filling the table with samples, control is passed initially to a unit 42 which initializes a pointer to the beginning of the table. The pointer is in effect an address register associated with the RAM memory 22, and the unit 42 loads a quantity into the address register such that a word may be written from the analog to digital converter unit 18 over the line 19 to the first location of the table portion of the RAM memory 22.

Unit 42 then passes control to unit 44, which enables the word on the line 19 to be received by the processor unit 20. Control then passes to unit 46, which functions to store the received word in the first location of the table in the RAM 22. Control then passes to unit 48, which introduces a predetermined time delay before control is passed to the next unit 50. The time delay allows for the spacing of samples relative to the length of the bill as it is being sensed by the sensing unit 14. When the prescribed time delay is up, control passes to unit 50, which determines whether the input table is full by examining the state of the pointer address register. The first time that the unit 50 is entered, the pointer stands at the address corresponding to the first storage location in the table, and control is returned to the unit 44 over a line 52. Then the sequence of operations involving units 44–50 is repeated, with the pointer being incremented for each sequence by the unit 46. When the pointer has been incremented to the last storage location of the table, the table has been filled, and control is then passed over the line 54 to the first of the group of units 40, which performs the data validation function. In a preferred embodiment of the present invention, 6140 storage locations are provided which is adequate to store all of the scanned data samples within the area printed with magnetic ink on a genuine bill.

Figure 4:
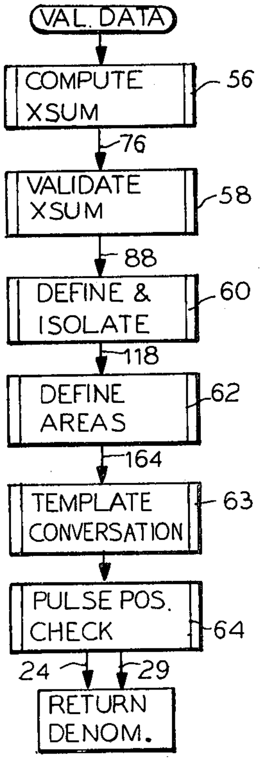

FIG. 4 ilustrates the group of units which perform the data validation function. The first group 56 computes the excursion sum of the data values which have been loaded into the table. Then control is passed to the second group 58, which compares the excursion sum with values stored in the ROM which correspond to expected excursion sum values for typical bills of the individual denominations. Bills which are genuine, and not unduely mutilated, have excursion sums which are equal or close to the prescribed excursion sum. The ROM also stores a tolerance in the excursion sum, so that the difference between the stored typical value of excursion sum and the sensed value can be compared with the tolerance to determine whether the bill being inspected within tolerance for any denomination. If not, it is rejected to the reject exit 28, and the control is returned to the unit 36 (FIG. 2).

If the excursion sum is validated, control is passed to a group of units 60 which defines and isolates pulses within the data stored in the RAM. This compresses the data, and the isolated pulse information is rewritten into the same location of the RAM, replacing the raw data from the ADC 18.

When the pulses are defined and isolated, control passes to a group of units 62, which define certain specific areas within the scanned bill, as represented by the data in the RAM.

After the area definition procedure, control is passed to a group of units 64, which compares the location of significant isolated pulses with their expected positions stored in ROM for various denominations, with the tolerances also stored in ROM. Denominations which have stored reference values which coincide to the location of significant pulses of the bill being scanned are recognized, the number of such coincidences are counted for each denomination.

A precise coincidence is not necessary, but the coincidence must occur within a given tolerance, such as within eight consecutive scanning samples, which allows for the scanned bill to have non-standard dimensions, due to crumpling or the like. This also creates a tolerance for non-uniform scanning speeds of the sensor 14 along the length of the bill.

At the end of the coincidence counting procedure, an inspection is made as to whether the total number of coincidences for any denomination is equal to the total number of significant pulses stored in ROM. If so, or if the number of coincidences is one less than that number, the bill is identified as genuine, and belonging to that denomination. Control then passes over line 29.

If not, control passes to a group of units (shown in detail in FIG. 12), which function to increase the coincidence tolerance (for example to 10 samples), and the procedure is repeated. If need be, the tolerance is increased again, and the process repeated until the tolerance has reached 20. Otherwise control returns to the group 64.

If the difference in the number of coincidence is still greater than one and a tolerance of more than 20 is reached, the bill is rejected as non-genuine or non-readable. In addition, the unit 64 notes significant pulses which lie between the pulses which are accepted as coincidences, and an excess number of these results in rejection of the bill as non-genuine, by passing control over line 24.

When a single denomination of the bill under test is identified, and appropriate signals are provided on the output lines 24 and 29 for controlling the diverter unit 22 and the output device 30.

Figure 5:
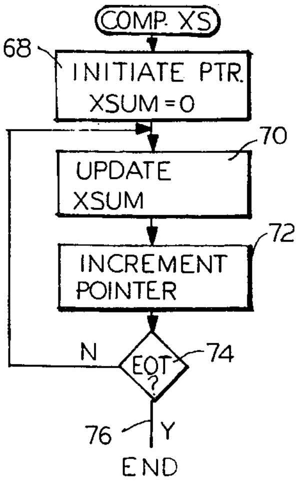

The group of units for computing the excursion sum is illustrated in FIG. 5. Control is initially passed to a unit 68, which initializes the pointer to the beginning of the table in the RAM 22. Control is then passed to a unit 70 which performs the excursion sum calculation. The first step in this calculation is to subtract from the sample values stored in the first storage location of the table a base line value, corresponding to average noise level, so that noise does not become a part of the excursion sum. The difference is stored in a register such as an accumulator, and then control is passed to a unit 72 which increments the pointer to the next storage location of the table. Unit 74 then determines whether the last storage location of the table has been reached, and if not, control is returned to unit 70, which calculates the difference between the values stored in the next storage location of the table and the average noise level, and adds the difference to the accumulator, whereby the accumulator accumulates or integrates the noise free portions of all of the samples stored in the table. When the end of the table is reached, control passes over line 76 to the first of a group of units 58 for validating the excursion sum.

Figure 6:
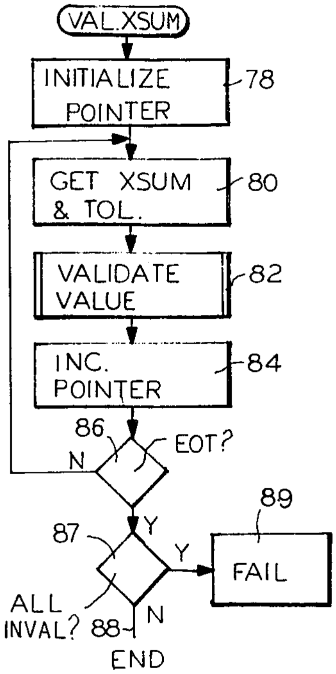

The group 58 is illustrated in FIG. 6. A unit 78 initializes the pointer to the denomination table portion of the RAM 22, and then control is passed to a unit 80 which fetches the excursion sum value and the excursion sum tolerance of the first denomination stored in the denomination table. Control is then passed to a group of units 82, which performs the function of validating the excursion sum relative to the first denomination stored in the table. If the excursion sum cannot be validated relative to the first denomination, that denomination is recorded as invalid in the RAM 22, by a process described hereinafter. Control passes from unit 82 to a unit 84, which increments the pointer, and then unit 86 determines whether the end of the denomination table has been reached. If not, control is returned to the unit 80, and the operations of units 80–84 are performed for the next denomination stored in the denomination table. When all of the denominations have been processed in this manner, the pointer stands at the address of the last storage location of the denomination table. Control then passes to unit 87 which determines whether all denominations ($1–$100) have been marked invalid. If so, control passes over line 89 to the fail routine. If not, control passes over the line 88 to the group of units 60 (FIG. 4).

Although not shown in detail, it will be apparent that the validity check performed by the unit 87 can be facilitated by setting a flag when any denomination is not found invalid. Inspection of the flag, after all denominations are checked, then shows whether all denominations are invalid or not. Preferably, a group of flags are also set, individually, for denominations found to be invalid so that the following procedures do not need to be performed for denominations which have already been ruled out. At this point, all of the denominations for which excursion sums are stored in the denomination table have been compared with the excursion sum calculated by the apparatus of FIG. 5, and all of the denominations which do not correspond, within the prescribed tolerance, with the calculated excursion sum have been marked as invalid.

Figure 7:
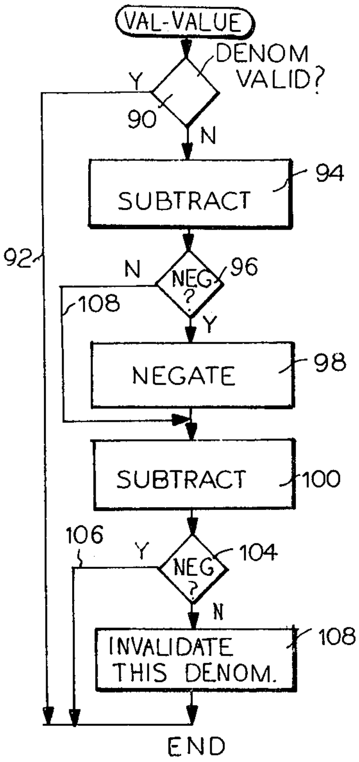

The group of units 82, which perform the function of validating excursion sum, is illustrated in FIG. 7. Unit 90 determines whether the denomination indicated by the pointer has already marked invalid, and if so, control passes over a line 92 directly to the output of the group illustrated in FIG. 7. If not, control passes to unit 94, which subtracts the excursion sum from the template excursion sum value which was fetched by the unit 80 (FIG. 6). Control then passes to a unit 96, which determines whether the result is negative, and if so, unit 98 inverts the sign of the result and passes control to unit 100. If the result is not negative, control passes directly to the unit 100 from the unit 96 over a line 102. The unit 100 subtracts the template tolerance from the result, and passes control to unit 104 which inspects the sign of the result or difference. If the sign of the new result is negative, it means that the result did not exceed the tolerance, so that the calculated excursion sum is within tolerance. In this event, control passes to the output over a line 106. On the other hand, if the result is not negative, the excursion sum is determined not to be within tolerance, a control passes to a unit 108, which stores an indication in the denomination table that this denomination is invalid, after which control passes to the unit 84 (FIG. 6). It will be appreciated that by the time the operations of the units of FIG. 6 have been completed, the denomination table stores an indication of invalidity for each denomination which did not match the excursion sum within tolerance. Thus, when control is returned to group 60 (FIG. 4) over line 88, a number of the denominations may already have been indicated to be invalid, in reference to the bill being sensed. At least one, however is not marked invalid, or control would have passed over line 89.

Figure 8:
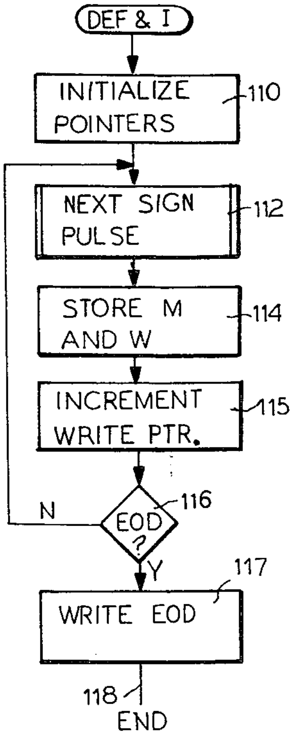

The group of units 60 is illustrated in FIG. 8. A unit 110 initializes the read and write pointers to the first storage location of the table, and control then passes to a group of units 112, which locate the next significant pulse which is defined hereinafter. Control then passes to unit 114 which stores the magnitude and width of the significant pulse, and passes control to a unit 115 which increments the write pointer, and then to unit 116 which inspects the address of the pointer to determine whether it has reached the end of the table. If the end of the table has been reached, unit 117 writes an end of data indication into the RAM, and control passes to the group 62 (FIG. 4) over the line 118. If the end of the table has not been reached, control is returned to the unit 112 over a line 120, for locating the next significant pulse. Then the unit 114 stores the position of the next significant pulse in the RAM 22 at the location specified by the write pointer. The use of the separate read and write pointers allow the isolated pulse data to over write the data in RAM, thus conserving RAM space.

Figure 9B:
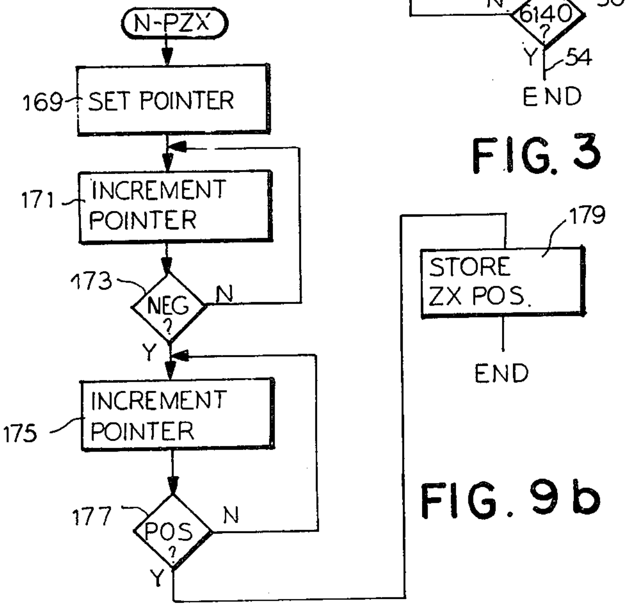
Figure 9A:
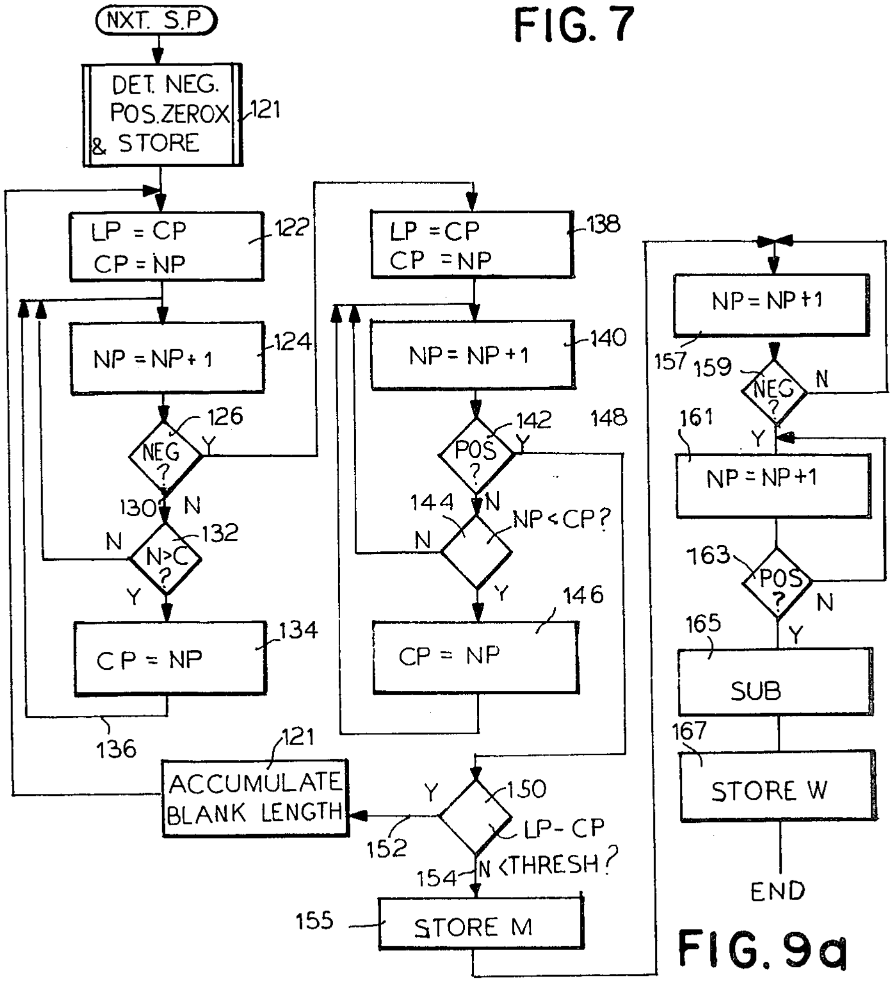

A group of units 112, which locate the next significant pulse, is illustrated in FIG. 9*a*. The group 121 locates a negative-to-positive zero cross over, and then unit 122 stores in a pair of registers provided in the RAM 22 the current read pointer position NP. These two registers are provided for storing the address of the last peak pulse (LP) and the current peak pulse (CP). Initially however, they are set to the address of the pointer when unit 122 first receives control, which is after unit 110 (FIG. 8) has initialized the pointer to the beginning of the table. Control then passes to unit 124, which saves the magnitude and increments the pointer, and passes control to unit 126. The unit 126 inspects the sign of the quantity stored at the storage location to which the read pointer points, and passes control over a line 128 if the quantity has negative polarity. It will be assumed that the first quantity has positive polarity, so that control passes over line 130 to a unit 132. Unit 132 compares the magnitude of the samples stored in the table at the location addressed by the pointer, with the magnitude stored in the table at the location stored in the CP register. If the magnitude at the location specified by the address pointer is larger, control is passed to unit 134, and the CP register is updated to store the current address of the address register pointer, corresponding to the latest compared sample. Control is then returned to unit 124 over line 136, so that the operations of units 124–132 are repeated for all consecutive positive values stored in the table. When a sample value is encountered which is less than the value of the quantity stored at the storage location identified by the CP register, control is returned directly from unit 132 to 124. In this way, the CP register stores the address of the maximum positive signal which is encountered in the first portion of the data stored in the RAM.

When the first negative quantity is encountered in the table, unit 126 passes control over the 128 to unit 138, which loads the LP register with the address stored in CP, and loads the CP register with the current state of the address register. Unit 140 then saves the magnitude and increments the read pointer and passes control to unit 142, which determines whether the quantity stored at the location specified by the address register is positive or negative. If negative, control passes to unit 144, which compares the quantity stored at the storage location identified by the address register with that stored at the location identified by the address stored in the CP register. If the current sample value, stored at the storage location identified by the address register, is less than the value stored at the address indicated by the CP register, control passes to unit 146, which updates the address stored in the CP register with the address of the read pointer. Then control is passed to the unit 140, which increments the read pointer and repeats the functions of units 142 and 144 as long as negative values are encountered. For any sample which is encountered of value greater than that stored at the location identified by the CP register, control is returned directly to unit 140 from unit 144. In this way, the CP register stores the address of the most negative sample, following the most positive sample, the address of which is stored in the LP register. This operation is repeated, until the unit 142 identifies a positive sample, upon which control is passed over line 148 to the unit 150. The unit 150 calculates the difference between the quantity stored at the storage locations indicated by the LP and CP registers, and compares the difference with a threshold value stored in the ROM. If the difference does not exceed the threshold value, control is returned to unit 122, via the unit 121 which accummulates the lengths of blanks between pulses.

The sequence described above is repeated. In the repeated sequence, a new positive peak is identified and its address stored in LP, and a new negative peak is identified and its address stored in CP. Then the unit 150 calculates the difference M and compares it with a threshold value. If threshold value is exceeded, control passes to unit 155 over line 154, and the magnitude M is stored. The following units then identify a positive-to-negative zero crossing, after which the pulse width W is stored.

Unit 157 increments the pointer and unit 159 inspects to see whether the next data point is negative. If not, it recycles until a negative data point is found, after which the pointer is again incremented by unit 161 and unit 163 seeks a positive data pointer. When such is found, it indicates a negative-to-positive zero crossing, and unit 165 subtracts from the location of the current data point, the value stored by the group 121 when the previous zero crossing was detected. This gives the pulse width W which is stored at the same location as the pulse magnitude M for that data point.

The group 121 is shown in FIG. 9*b*. Unit 169 sets a pointer, and unit 171 increments it. The next data point is read, and unit 173 inspects to see whether it is negative. If not, control returns to unit 171. If it is negative, the pointer is incremented and unit 177 seeks a positive data point. When it is found, the position is stored for later use by unit 179, and then control returns to unit 122 (FIG. 9*a*).

In FIG. 8 the next unit is unit 114, which stores the magnitude and width of the significant pulse which has been located in the storage location identified by the write pointer, after which an end of data word is written by unit 117 and control passes over line 118 to the group 62 (FIG. 4).

Figure 10:
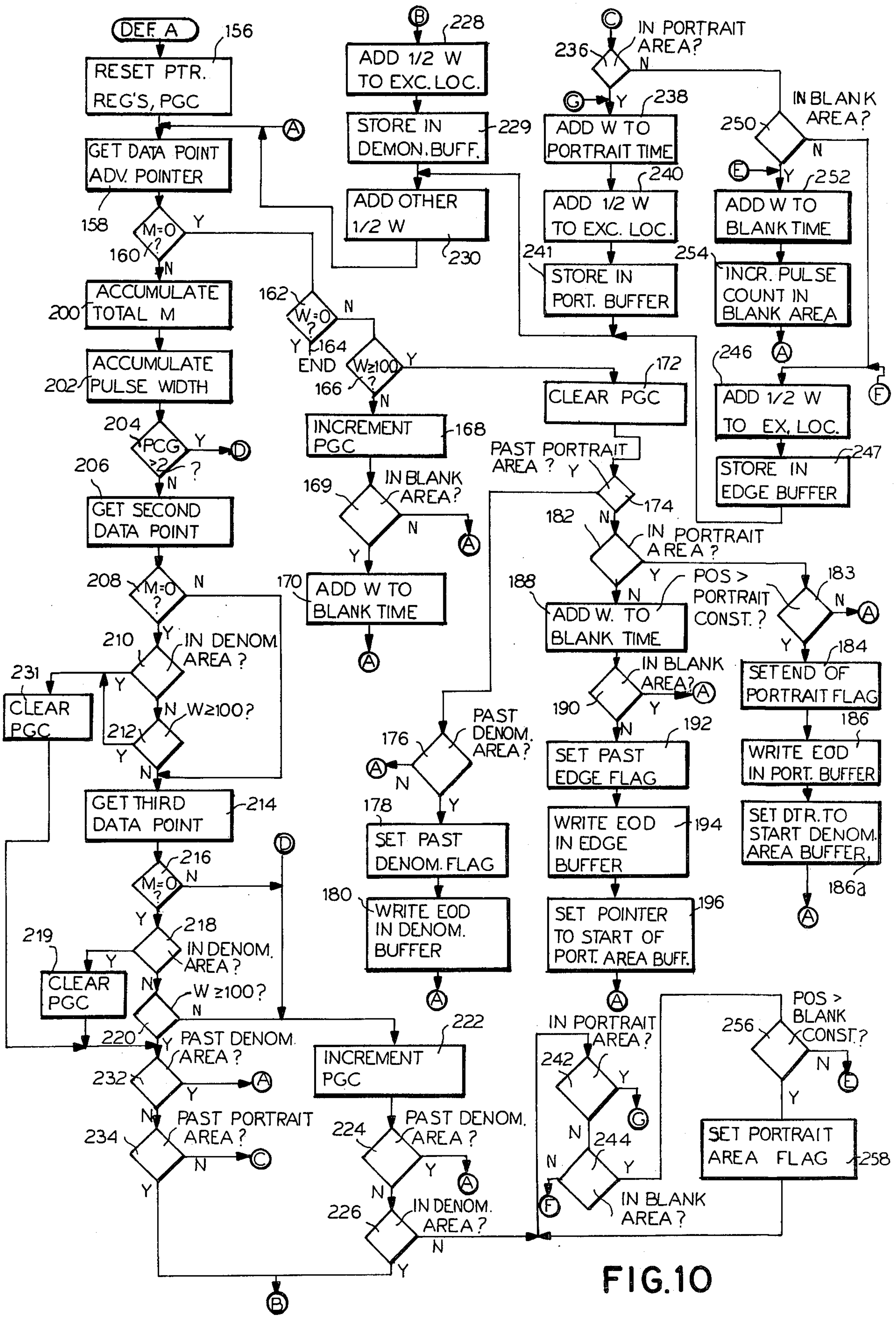

The group 62 is illustrated in FIG. 10. Unit 158 resets the pointer to the beginning of the data table, and also resets the working resisters and resets the pulse group counter PGC. Control passes to the unit 158 which gets the first data pulse and advances the read pointer. Then unit 160 determines whether the magnitude of this pulse is zero, and if yes, control passes to a unit 162 which examines whether the stored pulse width of this pulse is zero. If so, it indicates the end of the data, and control returns to the main sequence over line 164. If it is not the end of the data, unit 166 examines whether the pulse width is more than 100 intervals, and if not unit 168 increments the PGC counter. The PGC counter contains a count of the consecutive pulses which are encountered when three of these are located in sequence, it is recognized that the data is not from a blank area on the bill being scanned, but may be from a significant data area.

After updating the PGC counter, unit 169 checks the status of a flag indicating whether scanning is in the blank area or not. If so, the width of the current data pulse is added to the blank area time in unit 170, and control returns to unit 158, which repeats the sequence for the next data pulse. If unit 169 determines that the scanning is not taking place in the blank area, control returns directly to the unit 158.

If the unit 166 determines that the pulse width is greater than 100, the PGC counter is cleared by unit 172, and the unit 174 inspects the flag to determine whether the scanning has passed the portrait area of the bill. If so, control passes to unit 176 which inspects the flag to determine whether scanning has passed the denomination area. If so control returns to unit 158. If not, a unit 178 sets a flag indicating that the denomination area has been passed and unit 180 writes an end of data word in the denomination buffer, to indicate that the end of the denomination area has been reached. This is identified specifically by the fact that the data magnitude is zero (indicating a blank area) and the flags checked in units 174 and 176 indicate the scanning is past the portrait area but not past the denomination area.

If unit 174 indicates that scanning is not past the portrait area, control is passed to unit 182, which inspects the flag to determine whether the scanning is in the portrait area. If so, control passes to unit 183 which determines whether the current scanning position is greater than a stored constant which identifies the minimum end of the portrait area, and if not, control returns to the unit 158. If so, the unit 184 sets a flag indicating that the end of the portrait area has been reached, and unit 186 writes an end of data word into the portrait area buffer. Then unit 186a sets the pointer to the start of the denomination area buffer and then returns control to unit 158.

If the unit 182 determines that scanning is not in the portrait area (when scanning is taking place in the blank area prior to the portrait) unit 188 receives control and adds the pulse width of the data pulse to the blank area time, after which unit 190 inspects the flag to determine whether scanning is now taking place in the blank area. If so, control is returned to unit 158. If not, unit 192 receives control and sets a flag indicating that scanning has passed the left hand edge area of the bill (and has entered the blank area). Then unit 194 causes an end of data word to be written into the edge area buffer, and unit 196 sets a pointer to the start of the portrait area, and returns control to unit 158.

If the unit 160 determines that the magnitude is not zero, indicating a pulse rather than a blank area, unit 200 receives control and adds the pulse magnitude to the accumulated total magnitude maintained in an M register. The unit 202 adds the pulse width of the data pulse to the accumulated pulse width in a register, after which the unit 204 examines the state of the pulse group counter to see whether it is greater than two. If not, unit 206 gets the second item of data and unit 208 inspects whether its magnitude is zero (designating a blank area). If it is, unit 210 inspects the flag to determine whether scanning is taking place in the denomination area. If not, unit 212 inspects the width of the blank area to see whether it is equal to or greater than 100. If not, unit 214 obtains the third item of data from the RAM. If unit 208 indicates the magnitude is zero, a third data item is obtained directly. Then unit 216 inspects to determine whether the magnitude of the third item is zero, and if so, unit 218 inspects whether scanning is taking place in the denomination area. If so, unit 219 clears the PGC counter and passes control to unit 232. If not, the pulse width is examined by unit 220 to see whether it is equal or greater to 100 and if not, control passes to unit 222.

The unit 222 also receives control from the unit 204, if the pulse group count is greater than two, from and the unit 216 if the magnitude of the third data pulse is not equal to zero. In all of these events, the unit 222 increments the PGC counter, and passs control to a unit 224, which inspects the flag to determine whether scanning has passed the denomination area. If so, control is returned directly to unit 158. If not, unit 226 inspects the flag to determine whether scanning is taking place in the denomination area. If so, unit 228 receives control and adds one-half of the pulse width to a register which maintains the count of the existing location, by adding the pulse width of each pulse representing data, and the length of each item of blank representing data. This total is then stored by the unit 229 in the denomination area buffer, and identifies the mid point of a significant pulse. Then unit 230 adds the other half of the pulse width to the existing location register, and returns to unit 158.

If the unit 220 determines that the pulse width is greater than 100, it passes control to unit 232, which inspects the flag to determine whether scanning has passed the denomination area. If so, control returns directly to unit 158. If not, unit 234 inspects the flag to determine whether scanning has passed the portrait area. If so, control is passed to the unit 228 which has been described above.

If the unit 210 determines that scanning is taking place in the denomination area, or if the unit 212 detects a width greater than 100, unit 231 clears the pulse group counter, and passes control to the unit 232 which has been described above.

When the unit 234 determines that scanning has not passed the portrait area, control passes to a unit 236 which inspects the flag to determine whether scanning is within the portrait area. If it is, unit 238 adds the pulse width to the portrait time, and then unit 240 adds one-half of the pulse width to the existing location, which sum is stored in the portrait area buffer by unit 241. Then control is passed to unit 230 which adds the other half of the pulse width before returning control to unit 158.

If the unit 226 determines the scanning is not within the denomination area, control passes to unit 242 which inspects whether it is within the portrait area. If so, control is passed directly to the unit 238. If not, unit 244 inspects the flag which determines whether scanning is taking place within the blank area. If not, unit 246 receives control, adds one-half of the pulse width to the existing location counter and unit 247 stores the sum in the edge area buffer. Then unit 230 adds the other half to the existing location counter and returns control to unit 158.

If the unit 236 indicates that scanning is not taking place in the portrait area, unit 250 receives control and inspects the flat to determine whether scanning is in the blank area. If not, control is passed to unit 246 which has been described above. If scanning is in the blank area, however, control passes to unit 252, which adds the pulse width to the blank area time, after which unit 254 increments the count of the pulses encountered in the blank, and returns control to unit 158.

When unit 244 determines the scanning is taking place within the blank area, unit 256 receives control and examines whether the existing location, manifested in the existing location counter, is greater than the constant stored in ROM indicating the minimum possible location of the blank area. If the existing location is beyond that point, unit 258 sets a portrait area flag, and passes control to unit 242 which has been described above. If not, control passes to unit 252, which has also been described above.

The operations described above are repeated, until the end of data is recognized by the unit 162, after which control is returned to the main sequence (FIG. 4). During these operations, three buffer areas have been defined in the RAM, during which areas are referred to when significant pulses are later analyzed. These are the edge area, adjacent the left hand margin of the bill being scanned, the portrait area, in approximately the center of the bill, and the denomination area which is located between the portrait area and the right hand margin of the bill. One additional significant area is the blank area between the left hand edge area and the portrait area, and the number of pulses occurring in this blank area is counted. In addition, the total width of the pulses in the portrait area is accummulated. Also the total magnitude of all the pulses is accumulated, and the total width of all the pulses also is acummulated.

In later operations, the total width of pulses within the portrait area is compared to the total width of pulses in all non-blank areas, and the ratio of these quantities is compared with a stored constant and tolerance. The total number of pulses encountered within the blank area is also compared with a stored constant and tolerance, and a failure of either of these comparisons can result in a rejection of the bill.

The total blank area time encountered is later compared with a constant indicating the standard time of the blank area, for developing an adjustment factor by which the template is adjusted. This adjustment permits old but genuine bills to be recognized which have been changed in length because of stretching, crumpling or the like, or because of differences in scanning speed.

Finally, the buffers which has been set up for the edge area, the portrait area, and the denomination area, store the locations defining the beginnings of the areas. The ends of the areas are identified by end of data words. These locations are referred to in later sequences when the key pulse locations within these areas are compared with the scanned data to determine genuineness and denomination.

Figure 11:
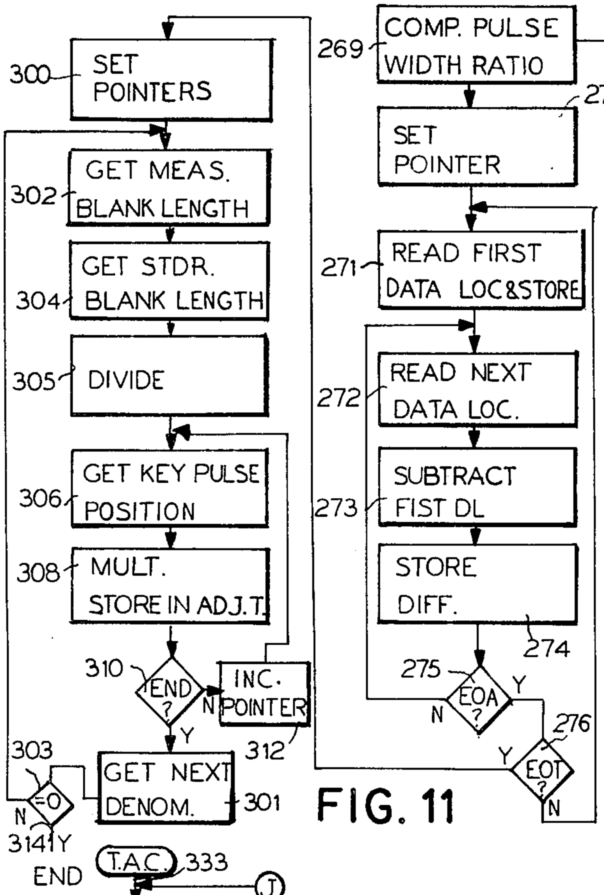

FIG. 11 illustrates the group of units 63 which make up the template conversion routine. Control is passed initially to a unit 267 which compares the blank area time with a stored constant (5) and unit 269 which compares the ratio of the total pulse width in the portrait area to the total pulse width during the scan. This ratio must be between 1.6 and 2.7. If the ratio is not correct, or if more than five pulses are found in the blank area, the bill is rejected. Otherwise control passes to unit 270. Unit 270 first sets a pointer to the first data point in the first area buffer, after which unit 271 reads the first data location and stores it. Then unit 272 reads the next data location, unit 273 subtracts the first location from it, and the difference is stored at the same memory location by unit 274. Unit 275 inspects to determine if the end of the area has been reached, and returns to 272 to repeat the above operations for all data locations in the area, after which control is passed to unit 276. Unit 276 determines whether the end of the table has been reached, and if not, control passes to unit 271 and the sequence is repeated until all data locations have been adjusted. In this way, the locations of all pulses are referenced to the first pulse in its respective area.

Then control passes to unit 300 which sets pointers, after which unit 302 gets the total blank length accummulated in the groiup 62. Unit 304 then gets the standard length for the blank area from ROM, and unit 305 divides the first quantity by the second. Control is then passed to unit 306, which obtains the first key pulse position from the template table in ROM, and then unit 308 multiplies the location for the first key pulse by the factor resulting from the division operation in unit 305, and the product is stored in the location of RAM identified as the adjusted template table. Control then passes to unit 310 which determines if the end of the template table in ROM has been reached, and if not, a pointer is incremented by unit 312, and control is returned to unit 306. When the end of the table is reached, control passes back to unit 301 which gets the next denomination, and then unit 303 checks to see if it is zero. If not, control returns to unit 302 and otherwise to the main routine over line 314.

The effect of this program is to modify all of the template pulse position data stored in ROM, adjusting it according to the length of the blank area for the bill being scanned. If this is longer than normal, because the bill has been stretched, or a slow scanning speed, all of the locations in the template are increased in the same proportion. Similarly, if the bill is undersized, because of crumpling or the like, or the scan speed is fast, all of the locations of the key pulses stored in ROM are shortened in the same proportion before being stored in the adjusted template table. A different scanning speed produces the same result.

In later operations, it is the adjusted template table which is referred to in comparing the scanned data with the template data.

Figure 12:
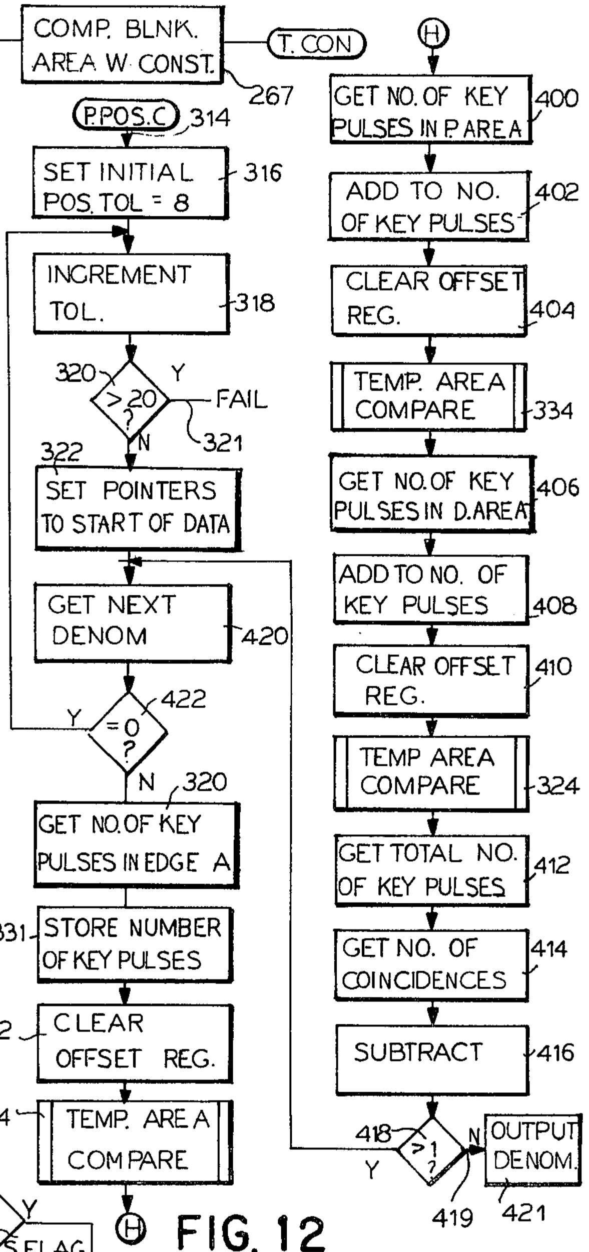

FIG. 12 illustrates the group of units making up the pulse position check routine. Control passes to unit 316 over the line 314, and the unit 316 sets the initial position tolerance equal to 8. Then unit 318 increments the tolerance (to 9) and passes control to a unit 320 which compares the position tolerance with the quantity 20. If it is greater than 20, control passes over line 321 to operate the reject mechanism, rejecting the bill as being non-genuine or unreadable. If the tolerance does not reach 20, unit 322 receives control and sets the pointers to the start of the data area, after which unit 324 gets the next denomination. If it is equal to zero, the unit 326 passes control back to the main sequence over line 328, as all of the denominations have been processed. If the denomination is not zero, the unit 330 gets the total number of key pulses which are to be looked for, which quantity is stored by unit 331, after which unit 332 clears the offset register and passes control to a group of units 334.

Figure 13:
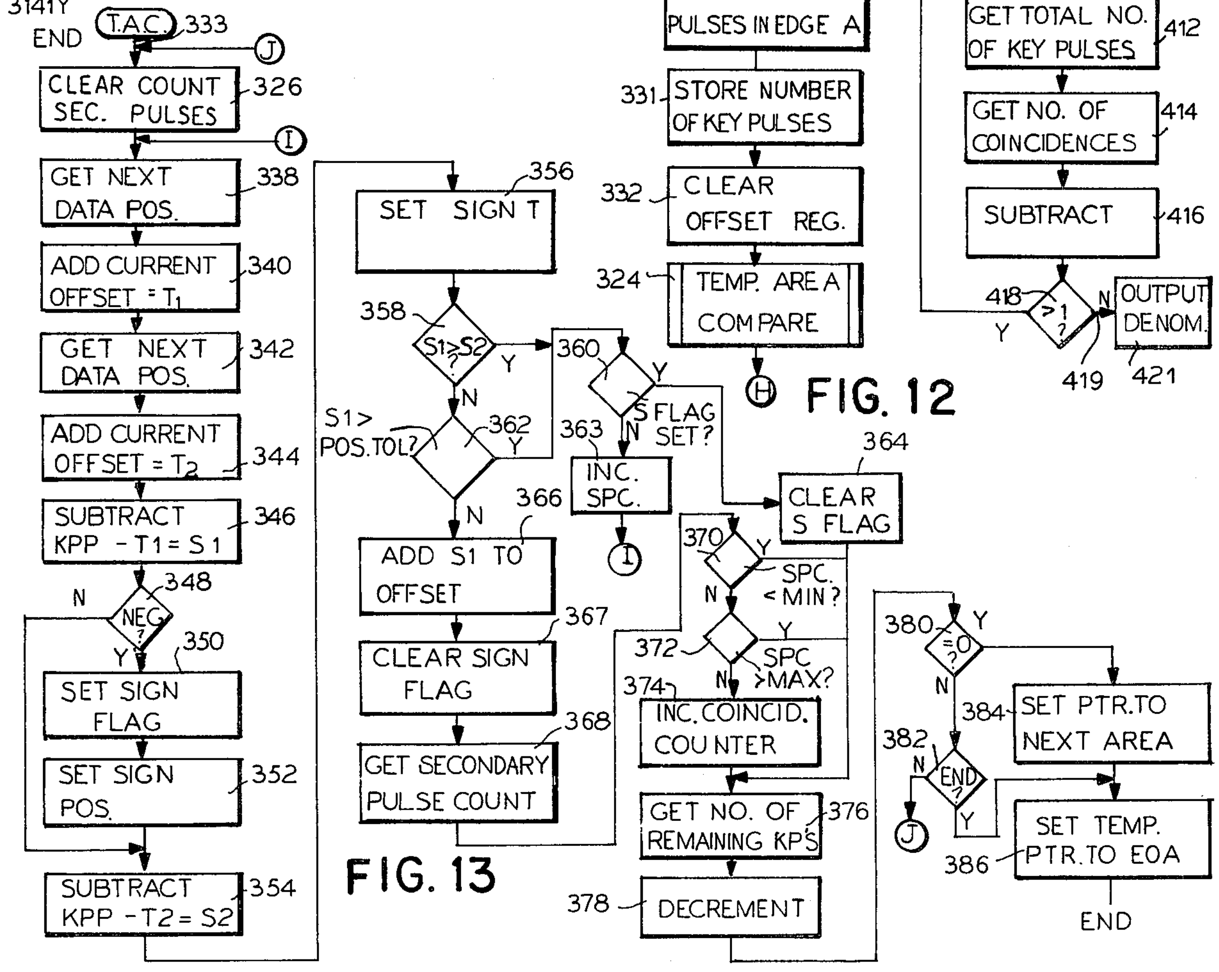

The group 334 comprises a template area compare routine, which is illustrated in FIG. 13.

As shown in FIG. 13, control is passed to unit 336 over a line 333, and the unit 333 clears the secondary pulse counter SPC, so that SPC equals zero. Then unit 338 gets the next data pulse position, and unit 340 adds the current offset (initially zero) to it. Then unit 342 gets the next data pulse position, and unit 344 adds the current offset to that pulse location. Then unit 346 subtracts the first total (calculated in unit 340) from the next key pulse position (read from the adjusted template table) and unit 348 inspects the result to see whether it is negative. If so, a sign flag is set by unit 350, after which unit 352 sets the sign to positive, and passes control to unit 354. Unit 354 sbtracts the total derived in unit 344 from the same key pulse position, and passes control to a unit 356 which sets the sign of the difference to positive. Then unit 358 determines whether the difference developed in unit 346 is greater than that developed in unit 354. If it is, control is passed to unit 360. If not, control passes to unit 362 which determines whether the difference derived in unit 346 is greater than the position tolerance, set by unit 316. If so, control passes to the unit 360. The unit 360 inspects whether the sign flag is set, and if not, unit 363 increment the secondary pulse counter, and returns control to unit 338.

When the unit 360 receives control, it is because the first data pulse does not correspond with the first key pulse location, either because it is beyond the tolerance (unit 362) or because the second data pulse is closer (unit 358). In either event the secondary pulse count is increased by unit 363 (indicating that the first data pulse is a secondary pulse between key pulses). If however the sign flag is set, the first pulse is already beyond the location of the first key pulse, so it is not counted as a secondary pulse. In this event, unit 364 receives control which clears the sign flag.

If the unit 362 determines that the difference between the location of the first data pulse and the first key pulse is not beyond the position tolerance, the first data pulse is known to the be the closest data pulse to the key pulse location. Then unit 366 receives control, which adds the signed difference developed by the unit 346 to the offset register, and clears the sign flag which may have been set by the unit 350. Accordingly the offset register now stores the position difference between the first pulse and the first key pulse location. This is used subsequently as a current offset by the units 340 and 344. Accordingly, even though the bill may be crumpled or stretched in one area, so that the locations in the adjusted template table do not accurately reflect the precise positions of the significant pulses during scanning of the bill, modification of the position by the current offset, which follows minor variations in position as they occur, enables bills to be recognized.

The unit 366 passes control to the unit 367 which clears the sign flag and 368 which gets the secondary pulse count from the counter SPC, and then unit 370 compares the SPC with the minimum tolerance stored in ROM. If the SPC is not less than minimum tolerance, control passes to unit 372, which compares it with the maximum value stored in ROM. If not greater than the maximum, a unit 374 increments a coincidence counter, and passes control to unit 376. If either of the units 370 and 372 indicate that the SPC count is not within tolerance, control passes directly to the unit 376, and the coincidence counter is not incremented.

Unit 376 gets the number of remaining key pulses, stored in unit 330, and then unit 378 decreases its number by one and passes control to unit 380. Unit 380 inspects whether the result is zero, and if not, unit 382 inspects to see whether the end of the area has been reached. If not, control is returned to the unit 336, and the routine described above is repeated.

If the unit 380 determines that the key pulses have all been inspected, unit 384 sets a pointer to the next area to be checked and unit 386 sets another pointer to the end of the current area, after which control is returned to the sequence illustrated in FIG. 12.

The end result of the sequence illustrated in FIG. 13, is that the coincidence counter stores the number of coincidences between key pulses in the adjusted template table for the edge area of the first denomination. A coincidence is recorded if any data pulse is within the position tolerance, provided the number of secondary pulses (occurring between successive key pulses) is within the tolerance specified in the ROM.

When control is returned to the routine of FIG. 12 from unit 386, unit 400 receives control and gets the number of key pulses in the portrait area, and stores this quantity so that it is available to unit 376 (FIG. 13) the next time this routine is activated. Then unit 404 clears the offset register, and then returns control to the template area compare routine 334 (FIG. 13). Because the offset register is cleared by unit 404, the offsets are calculated anew during the portrait area.

The operation of the group 334 has been described above, and when it is completed, the coincidence contains the total of coincidences recognized during the edge area and the portrait area. Control is then passed to unit 406 which gets the number of key pulses in the denomination area, and stores it at a location available to the unit 376 (FIG. 13). Then the number of key pulses in the denomination area is added to the total developed by the unit 402, and this is also stored. Then unit 410 clears the offset register, and returns control to unit 334 so that the template can be checked for the denomination area. When this is completed, unit 412 receives control and gets the total number of key pulses calculated in unit 408, and unit 414 gets the total number of coincidences counted by unit 374. The two quantities are subtracted by unit 416, and unit 418 determines whether the remainder is greater than one. If not, line 421 receives control, which causes the appropriate signals to be generated on the lines 24 and 29 (FIG. 4) which identify the correct denomination. If the difference is greater than one, unit 420 receives control, which gets the next denomination, and unit 422 inspects whether this is equal to zero, identifying the last denomination. If not, control is passed to unit 330, which repeats the sequence described above for the next denomination. If all denominations have been processed, the unit 422 recognizes a zero and returns control to unit 318, which increases the position tolerance, after which the procedure is repeated, unless the tolerancce has been increased to greater than 20, in which case the bill is rejected as being non-genuine or non-readable.

Figure 14:
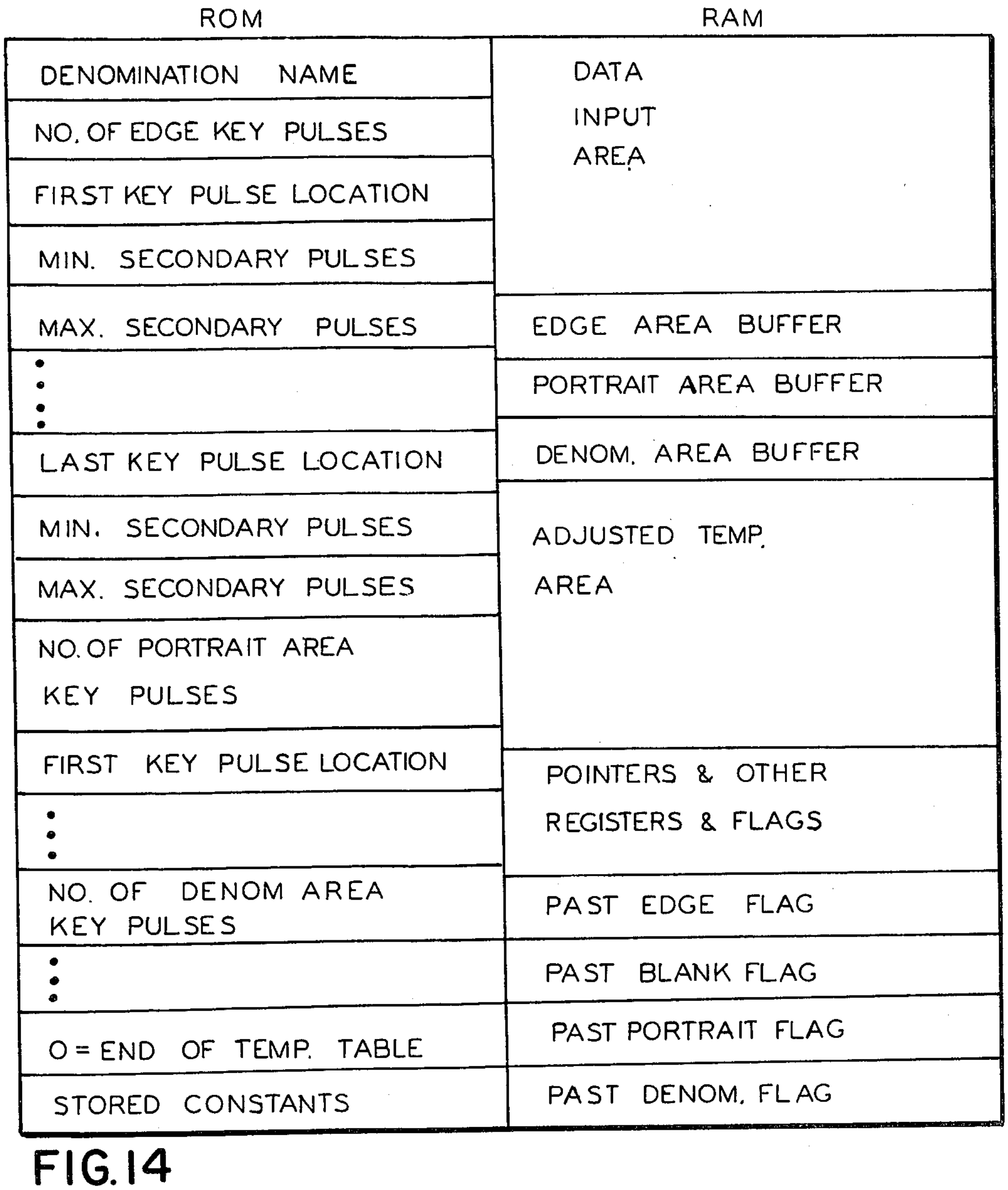
FIG. 14 is an illustration of the arrangement of data in the memory of the apparatus illustrated in FIG. 1.

FIG. 14 illustrates a partial map of the ROM and RAM memories, showing the template table in ROM, and the data table, the area buffers, the adjusted template table and certain other areas in RAM dedicated to certain registers and flags. A variety of working registers (not shown) are also provided, as is customary in connection with MPU's and the like, which hold or accumulate data when needed.

Figure 15:
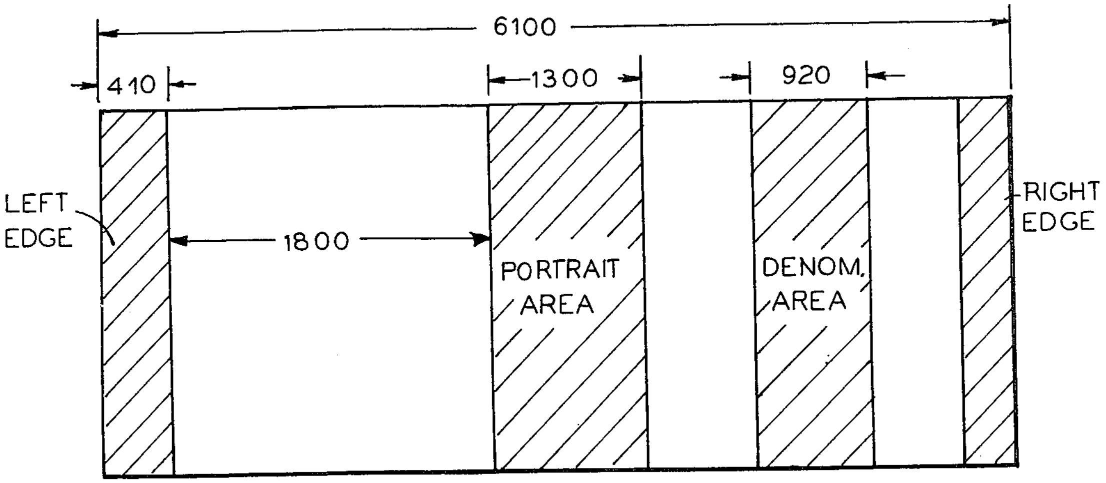
FIG. 15 is an illustration of a typical bill, with significant areas illustrated.

FIG. 15 illustrates a typical bill with certain significant areas identified. Normally, the bill is scanned at a linear speed of about 9.4 in/sec (about 24 cm/sec) and a sampling rate of 9.6 KHz is used. The significant areas of left hand margin or edge area, blank area, portrait area, and denomination area are shown, with the numbers of samples typically taken in those areas. Two blank areas and the right hand margin are ignored.

It will be appreciated that the operations described above result in the rapid identification of denominations of genuine bills, and production of output signals indicating the denomination of the bill being scanned. Because the positions in the templates stored in ROM are adjusted, in accordance with the actual conditions encountered during scanning of the bill, recognition of the correct denomination is not dependant on the bill having precise size characteristics, and is also not dependant on a particular scanning speed. If the scanning speed is higher or lower than a nominally constant value, this is reflected by different lengths set for the blank area, with the appropriate adjustment of all template locations accordingly. Similarly, the generation of offsets independently in each area of the bill being scanned makes it possible to read bills even though they may be crumpled or stretched in certain areas. Also, the incremental increase of the position tolerance makes it possible to modify the position tolerance selectively to accommodate conditions encountered in mutulated bills, while maintaining a tight tolerance for normal bills, so that there is no likelihood of misidentifying a bill denomination because of an excessive tolerance allowance. In addition the validity checks performed by the system identify and reject bills which are not genuine, either because the total pulse magnitude is incorrect, or because the total pulse width in the portrait area is not correctly related to the total pulse width throughout the scanning of the bill, or because too many secondary pulses are detected in the blank area, or because of an insufficient coincidence with adjusted key pulse locations.

It will be apparent that various modifications and additions may be made in the apparatus and method of the present invention without departing from the essential features of novelty thereof, which are intended to be defined by the appended claims.

For example, for some purposes it may be desirable to combine the magnetic scanning described herein with some optical scanning, which may be color sensitive to detect the colored treasury seal of reverse side of bill.

It may also be desirable to confine review of the scanned data to one certain significant portion first, such as for the left hand margin, and estimate from that the denomination of the bill. Then the ROM data for that denomination only is accessed, to confirm the initial estimate. This would tend to allow the identification of the correct denomination with the maximum speed.

Other checks can also be made of the physical characteristics of the bill, such as surface roughness or the like.

What is claimed is:

1. A method of detecting and designating the denomination of paper currency being scanned longitudinally by a magnetic read head, comprising the steps of:

(a) digitizing an analog signal developed by said read head for producing digital words indicative of said analog signal, (b) processing said words for developing data relative to the position of pulses represented by said analog signal, (c) modifying said position data in response to the relative length of one area of the bill being scanned relative to a standard length for said area, (d) comparing the modified positions with stored data representing normal locations for key pulses which are expected during scanning of a bill of one of a plurality of denominations, (e) counting the number of coincidences of scanned pulses relative to stored key pulse locations, and (f) developing an output signal indicative of the denomination of the scanned bill in response to the total number of said coincidences being approximately equal to the number of stored key pulse locations for said denomination.

2. The method of determining genuineness and denomination of paper currency comprising the steps of (a) scanning a scan path along said currency to develop an electrical signal responsive to characteristics of said bill along said scan path, (b) determining the positions of a plurality of significant pulses along said scan path, (c) modifying data representations of said positions in accordance with a sensed characteristic of said bill, (d) comparing the position of each of said significant pulses with predetermined limits for each of a plurality of denominations, said significant pulses being defined by positive peaks in said electrical signals which are followed by negative peaks which are different in amplitude from said positive peaks by more than a predetermined quantity, (e) selecting a denomination for which said positions of said significant pulses are within the predetermined limits, and (f) producing an output signifying the denomination of such bill.

3. The method according to claim 2, including the steps of digitizing said electrical signal, storing digital data representative of the magnitude and width of said pulses in a digital memory, and comparing said magnitude-representing data with a predetermined parameter for each of said denominations.

4. The method according to claim 2, wherein said modifying step comprises the steps of comparing the relative length of a specific area of said bill with a predetermined value, and modifying said data in response to said comparison.

5. The method according to claim 4, including the step of deriving the ratio of said specific area to said value, and multiplying said data by said ratio.

6. The method according to claim 2, wherein said comparing step comprises the steps of finding the position of the significant pulse which is the closest in position to each of a plurality of predetermined positions, determining the difference between said two positions, and comparing said difference with a predetermined tolerance.

7. The method according to claim 6, including the step of altering said predetermined tolerance in accordance with said difference associated with a previous significant pulse.

8. The method according to claim 2, including the step of counting the number of significant pulses in each of a plurality of areas of said bill, and comparing the number in at least one of said areas with the total number of significant pulses along said scan path.

9. The method according to claim 8, wherein said one area is the portrait area of said bill.

10. A method of detecting and designating the denomination of paper currency being scanned longitudinally by a magnetic read head, comprising the steps of:

(a) digitizing an analog signal developed by said read head for producing digital words indicative of said analog signal, (b) processing said words for developing data relative to the position of pulses represented by said analog signal, (c) comparing said position data with stored data representing normal locations for key pulses which are expected during scanning of a bill of one of a plurality of denominations, (d) counting the number of secondary pulses scanned between pulses which coincide with said stored locations, (e) comparing the number of secondary pulses with a stored quantity, and (f) developing an output signal indicative of the denomination of the scanned bill in response to the total number of said secondary pulse being approximately equal to said stored quantity.

11. Apparatus for determining the genuineness and denomination of a bill of currency, comprising in combination:

(a) means for scanning the physical parameters of said bill along a scan path on the surface of said bill, (b) means for developing an electrical signal in response to said scanning, (c) means for storing manifestations of the amplitudes of said electrical signal corresponding to a plurality of spaced locations along said scan path, (d) means for locating the positions of significant pulses along said scan path, (e) means for modifying data representative of said positions in accordance with a sensed characteristic of said bill, (f) means for comparing the positions of said significant pulses with predetermined limits for said pulses for each of a plurality of denominations, and (g) output means for providing an output signal corresponding to a denomination for which most of said significant pulses are within said predetermined limits.

12. Apparatus according to claim 11, including means for digitizing said signal and storing digital representations thereof in a digital memory.

13. Apparatus according to claim 12, wherein said locating means comprises means for comparing the sum of positive and negative excursions of said signal with a predetermined value, and means responsive thereto for identifying occurence of a pulse.

14. Apparatus according to claim 12, including means for storing data representative of the amplitude and width of said pulses.

15. Apparatus according to claim 13, including means responsive to said width-representative data for developing data representative of the position of said pulse.

16. Apparatus according to claim 12, wherein said means for modifying comprises means for determining the ratio between the length of one area of said bill and a standard length, and means for multiplying said position-representative data by said ratio.

17. Apparatus according to claim 12, wherein said means for modifying comprises means for adding an offset factor to each item of said position-representative data, and means for deriving said offset factor from the difference between the position of said significant pulses and predetermined positions.

18. Apparatus according to claim 17, including means for generating a new offset factor for each significant pulse following the first such pulse.

19. Apparatus for determining the genuineness and denomination of a bill of currency, comprising in combination:

(a) means for scanning the physical parameters of said bill along a scan path on the surface of said bill, (b) means for developing an electrical signal in response to said scanning, (c) means for storing manifestations of the amplitudes of said electrical signal corresponding to a plurality of spaced locations along said scan path, (d) means for locating the positions of significant pulses along said scan path, (e) means for comparing the positions of certain ones of said significant pulses with predetermined limits for said pulses for each of a plurality of denominations, (f) means for counting the number of significant pulses between said certain ones of said pulses, and (g) output means for providing an output signal corresponding to a denomination for which said counted number is within predetermined limits.

* * * * *